Nov. 8, 1966 F. H. APPEL ETAL 3,284,324

SUBSTRATE PREPARATION METHOD

Filed Dec. 28, 1962

5 MICRO INCHES/VERTICAL DIVISION

PRIOR ART

5 MICRO INCHES/VERTICAL DIVISION

INVENTORS
FRANK H. APPEL
VICTOR E. HAUSER JR.
ROBERT S. SMITH

BY John J. McCormack
ATTORNEY

United States Patent Office 3,284,324
Patented Nov. 8, 1966

3,284,324
SUBSTRATE PREPARATION METHOD

Frank H. Appél, Campbell, Calif., Victor E. Hauser, Jr., Corvallis, Oreg., and Robert S. Smith, San Jose, Calif., assignors to International Business Machines Corporation, New York, N.Y., a corporation of New York Filed Dec. 28, 1962. Ser. No. 247,997
6 Claims. (Cl. 204—38)

This invention relates to methods for preparing the surface of metallic substrates for subsequent deposition thereto and, more particularly, to a method for eliminating discontinuities and voids in magnetic films such as nickel-cobalt when plated on aluminum type subtrates such as those used for discs in magnetic recording.

As techniques for storing information evolve, it becomes evident that, in an effort to pack more and more information into a given record, improvements in the art are descending from the macroscopic to the microscopic unit of storage. This is especially true in the use of magnetic recording media, for instance, magnetic drums and discs, where data is stored as magnetized spots situated along aligned tracks around the radii of a disc or the periphery of a drum. Magnetic drums and discs are of distinct advantage in the data recording arts since they record quickly, can be used repeatedly without significant deterioration in quality, and are easy to modify and update in that each time new information is stored in a magnetized spot, it automatically "erases" the information formerly stored there. Thus, records may be read from discs or drums as often as desired until they are written over or erased. The time required to impress, or to sense data magnetically, is measured in terms of mere millionths of a second, an important advantage in data processing. These advantages suggest a further advantage for data processing with magnetic records, namely, high bit-density; that is, the ability of the magnetic surfaces to store tremendous amounts of data per unit area. As much as several thousand bits per square inch of storage area is possible using present techniques. With the present-day accent upon high bit-density, this advantage becomes progressively more attractive and the bit-density of magnetic records becomes increasingly critical.

High bit-density depends, in part, upon surface qualities of the magnetic coating. Small anomalies in the magnetic material upon a magnetic disc, as well as microscopic imperfections, can readily distort or "blank-out" significant record areas in the magnetic surface since they represent discontinuities in the magnetic recording material. Such defects make it necessary to either discard the magnetic disc or introduce complicated corrective means for identifying and compensating for these magnetic anomalies. With today's high bit-densities, it is becoming necessary to discard magnetic discs having discrete anomalies less than .003 of an inch in diameter. Since magnetic discs and drums usually comprise a substrate upon which magnetic material is coated to a closely-controlled thickness, it becomes evident that the physical smoothness of the substrate surface, and the consequent evenness of deposition are of high concern to workers in this art. This concern for uniform magnetic surfaces stems not only from the simple necessity of providing a continuously smooth and evenly distributed coating of magnetic material, but also because of such problems such as head-to-disc separation (a few 10-thousandths of an inch in some cases) and optical reflection properties. Such magneto-optical readout as Kerr optical techniques demand a degree of perfect optical reflectivity of a surface that was hitherto unimagined. Hence, it would be realistic to conclude that the future significance of magnetic discs and drums as recording media hinges directly upon the ability of workers in the art to provide perfectly smooth, entirely continuous films of magnetic material.

The solution to these smoothing problems which the present invention provides may be broadly characterized as a substrate preparing technique comprising two copper immersion plating steps with a polishing step interspersed therebetween, whereby the high spots are removed to further the leveling process. The second strike insures that any aluminum exposed by the polishing is plated, and further fills any voids. Overall smoothness is enhanced by the polishing and second immersion plating.

As is well known in the art, immersion plating (or displacement plating) involves the production of a deposit by simple immersion of a metallic article in a metal ion containing bath without any outside source of current. In this type of plating, some of the metal of the article chemically displaces an equivalent amount of the metal ion in the bath resulting in a plated layer of the metal in the bath on the substrate's surface. In order for immersion plating to occur, the metal being plated must be lower in the electromotive series than the substrate metal displacing it, i.e.—the substrate metal must have a greater tendency to lose electrons than the plated metal. Therefore, the metal ions in the immersion bath used in the present invention must be capable of being chemically displaced by aluminum.

One common and very practical way of providing a smooth magnetic coating is to electoplate the magnetic material upon a disc substrate such as a very smooth, highly polished aluminum disc. However, the smoothness of such aluminum discs, which of course is directly related to the smoothness of the resultant plated coating, has become a troublesome problem in the art. Disc polishing techniques have reached a new high in perfection but still leave much to be desired for advanced recording techniques which demand high bit densities. The instant invention has advanced polishing methods in an unobvious manner by novel "gradated" polishing and cleaning techniques, and more specifically, by interspersing polishings with copper immersion plating steps.

As will be evident from the particular embodiment described below, the polishing steps of the instant invention are planned so as to be gradated in a prescribed manner and are coupled with effective plating steps to remove all detritus. Less obvious, however, is the fact that these polishings attain a striking high degree of effectiveness when harmonized with copper immersion plating treatments. It has been found that a copper coating before and after a particular fine-polishing step produces an unexpectedly smooth substrate for electroplating purposes. This immersion plating also activates the substrate so that nickel-cobalt films subsequently electroplated thereon are more continuous.

The particular problem faced by the inventors was that of voids or foreign particles upon the surface of a magnetic disc substrate resulting in discontinuities in the plated magnetic film, as for instance, electroplated cobalt-nickel. These discontinuities are exaggerated when the film plated is very, very thin, since a minor void or inclusion is more likely to cause plating discontinuities as the thickness of the film decreases. As a result, these discontinuities can render a magnetic disc record useless for magnetic recording especially when the rejection specs are high (for instance, over one error per disc side with a 1000 B.P.I.–0.01 track width commonly indicates a rejection!). It is suspected that the discontinuities (or voids) also "injure" the electroplating process by "contaminating" the surface of the substrate. This is because the voids in the copper overlay reveal the aluminum substrate below, on which the magnetic material will likely refuse to deposit, resulting of course in an absence thereof recordable magnetic material.

Although the mechanism of this effect is not completely understood as yet, it is theorized that these copper dips may serve alternately to fill voids and then to fuse the filling material. The copper also appears to act as a catalyst in subsequent plating steps so as to increase the smoothness of plating depositions. Hence, it has been found that to polish a magnetic disc substrate according to the "graduated" polishing and cleaning steps of the instant invention and, further, to subject the substrate to a copper bath immersion before and after certain of the fine polishing steps, constitutes a highly effective way of insuring a perfectly smooth and wholly continuous overcoating of magnetic material on an aluminum substrate. The effectiveness of this technique is demonstrated by reference to FIGS. 1 and 2 showing measured plated-disc profiles with and without the copper immersion steps before and after polishing the disc and by reference to the observed fact that it has effected a decrease in the number of disc errors (and consequent disc rejection) on the order of 10:1.

While this particular copper "chemical deposition" bath has been used only on 7075 alloy aluminum, it could be modified to plate other aluminum alloys and could be used wherever a smooth, continuous copper-plated surface on aluminum is desired.

Thus, it is believed that the instant pre-plating treatment and polishing treatment are believed to be novel and achieved an unexpectedly high degree of improvement in the recording quality of magnetic surfaces, yielding a mirror-like finish that approaches magneto-optical and magnetic perfection.

Hence, it is an object of the present invention to provide pre-plating processes for facilitating the production of smooth and wholly continuous thin magnetic films deposited on a metal substrate.

Yet another object is to prepare aluminum type substrates for electrodeposition of magnetic material according to a process of "gradated" polishings, interspersed with copper immersions, whereby to achieve smoother surfaces on the disc.

Still another object is to provide a technique for preparing a disc substrate for deposition of magnetic material which eliminates a substantial portion of the magnetic recording errors caused by voids and foreign particles in the deposition.

Still another object is to specify a process whereby a metal surface may be smoothed and more completely covered by a protective coating by means of copper dipping steps interspersed with fine polishing.

The foregoing and other objects, features and advantages of the invention will be apparent from the following, more particular description of preferred embodiments of the invention, taken together with the following figures in which.

Figure 1:
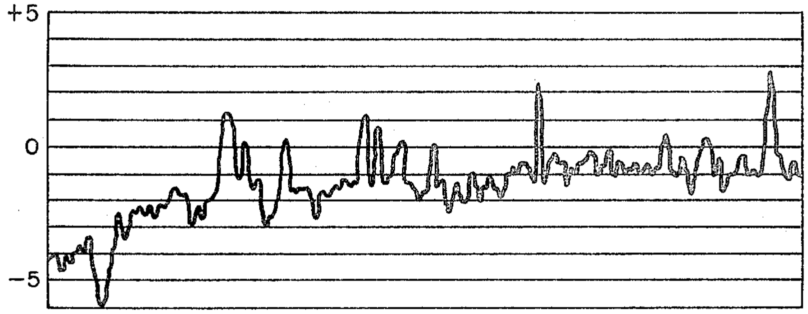
FIG. 1 is a reproduction of an actual disc-smoothness profile for a magnetic disc record prepared without the substrate preparation process steps of the invention.

In accordance with the present invention, a pre-plating process is provided for preparing the surface of aluminum-bearing substrates for the deposition of typical magnetic recording material such as cobalt-nickel alloys. The steps specified below as representative of this process are specific examples of how the invention may be carried out for a particular application and to produce a particular type of smoothness and freedom from magnetic defects. The details of these steps are listed below in Table I, in their skeletal form, for convenience. The description following the table should be consulted for the more specific details and the recommendations for each of the prescribed steps.

*Table I*

Step 1: Select substrate of practically pure (85% aluminum) compatible with copper overlay (e.g., 7075 alloy).

Step 2: Lapping substrate surface to a fine finish (about 7–9 microinches, arithmetic average).

Step 3: Cleaning surface (e.g., free of lapped particles and chemical impurities).

Step 4: Activate substrate surface (e.g., hot nitric acid), then remove activation residue.

Step 5: Copper dip to buffer-coat aluminum for plating and to smooth surface.

Step 6: Rinse and dry.

Step 7: Polish surface at least to 1 microinch arithmetic average—repeat as necessary.

Step 8: Pre-activation cleaning, physical and chemical—repeat as necessary.

Step 9: Activation as Step 4—repeat as necessary.

Step 10: Final copper dip, as Step 5—repeat as necessary.

Step 11: Water rinse.

Step 12: Electroplating.

The details of the process steps outlined in Table I above will now be described more particularly.

In Step 1, the selection of an appropriate aluminum-type substrate which is compatible with the copper dip used in the substrate preparation method is made. The method dictates that the disc be of substantially pure aluminum. Such a disc would be one fabricated from aluminum 7075 alloy made of substantially pure aluminum except for the following additive substituents:

| | Percent |
|---|---|
| Zinc | 5.6 |
| Magnesium | 2.5 |
| Copper | 1.6 |
| Silicon | 0.4 |
| Iron | 0.6 |
| Chromium | 0.3 |
| Manganese | 0.3 |
| Titanium | 0.2 |

This alloy was found particularly suitable for plating with thin cobalt-nickel for magnetic discs. Similar-constituent aluminum alloys would be suitable. Such alloys could be expected to be similar, not only in their compatibility to the copper strike treatment, but also in their relative hardness in the annealed or untempered condition. It is presumed that the disc substrate has been preliminarily prepared to provide a flat, stress-free metal.

The lapping treatment of Step 2 is to produce a fine-lapped surface within 7–9 microinches smoothness (arithmetic average) prior to the first copper dip. A suitable abrasive solution for this step would be one consisting of a 10-micron garnet-particle suspension in an appropriate vehicle (for instance, a suitable oil). Lap pressure of 1 p.s.i. should be adequate.

The object of Step 3 is simply to clean the substrate surface so as to remove the ground particles resulting from the lapping of Step 2, as well as any chemical residues. Any suitable method of cleaning may be employed, providing the lapped surface is not mechanically disturbed. Hence, one should not abrade, smear, polish, or burnish the surface. Ultrasonic cleaning with a suitable solution has proven successful for this cleaning cycle. One such suitable solution might be a solution of water, soap and detergent, followed by a distilled water ultrasonic rinse. As part of this cleaning step, a degreasing treatment may be included, if necessary. Such a treatment would consist of a dip in a good commercial degreaser such as a soak in "Diversey 17" to remove grease on the substrate surface. Other alternative cleaning treatments may be substituted as long as the surface is cleaned and its profile preserved in the "as lapped" condition.

The activation, or etching, step (Step 4) is performed by immersing the disc in an activating bath comprising an aqueous solution of concentrated nitric acid (20% by volume) and ammonium bifluoride (about 0.5 gram/ liter). This bath is kept at a temperature of from 105 to 110° F. The purpose of this dip is to remove foreign chemicals and impurities such as hydroxides and the like and to activate the substrate surface for copper deposition. While other activation baths could possibly be employed to activate the surface, this nitric acid bath is the only one known to be suitable. The residue from the activation bath is removed by a distilled water rinse. This rinse removes the nitric acid, etc., remaining on the substrate from activation.

The next step, Step 5, comprises dipping the substrate in a protective-coating bath, whereby a protective metal film may be electrolessly deposited upon the substrate so as to provide a protective buffer coating over the aluminum for plating purposes and, further, to fill and smooth the surface. This initial immersion tends to fill voids that would otherwise be difficult to eliminate by polishing steps. Moreover, when copper is used as this buffer-coating, the presence of the copper also appears to cause a smoother plating deposition subsequently due to a favorable chemical interaction during plating. As mentioned before, copper is the preferred protective metal for this coating, although similar buffer-smoothing metals, such as zinc, might be substituted. Of course, it is general practice to plate aluminum type substrates with zinc or copper prior to final plating with nickel or other metals because the copper (or zinc) coating protects the aluminum substrate from attack by the plating solutions and resultant inferior deposition. However, the depositing of copper or the like upon a substrate for purposes of smoothing the substrate, in conjunction with repeated copper dips, interspersed with gradated polishings, is unknown in the prior art. A suitable immersion bath for this treatment would comprise an aqueous solution containing the following constituents (in ounces/gallon):

| | |
|---|---|
| NaOH | 0.27 |
| NaCN | 3.7 |
| CuCN | 2.68 |
| Sodium stannate | 5.47 |

A suitable immersion time would be 5–6 minutes, although this may be varied according to coating-thickness desired. A thickness of from 5–20 microinches has been found suitable. This deposit not only smoothes the surface and buffers the plating on the aluminum, but appears to have a catalytic effect upon the electrolyte. Zincating could be substituted for the bronze dip, as noted above. However, it is less satisfactory since a rougher surface results which has less plating continuity. Hence, the bronze dip is preferred.

The copper-plated disc is now rinsed (Step 6) in distilled water to remove physical and chemical residues and is thereafter dried in air, for instance using an air gun.

In Step 7 the inter-strike polishing is performed between copper coatings. This may comprise any metalographic polishing technique which will yield a surface smoothness of at least 1 microinch (arithmetic average). One suitable technique is the following series of polishing steps:

First, the substrate is polished using a 15-micron diamond abrasive, suspended in paste, and dispersed in oil for a period of 1.5 minutes. This is followed by a final polishing with a 9-micron diamond for about 2 minutes. Any suitable substitute abrasive material may be used to produce the prescribed smoothness. This polishing definitely increases smoothness, probably due to a leveling of the deposited copper. The redistributed copper is thought to be fused by the subsequent copper dip.

Step 8 now follows wherein a cleansing operation is performed upon the substrate prior to the activation of Step 9. This step is similar to cleaning Step 3 for removing physical and the chemical detritus. Suitable steps have been found to be: an ultrasonic cleaning in a suitable solution followed by a cotton swabbing; and then a second ultrasonic immersion in a cleaning solution, containing soap, detergent, and water, for about 30 seconds. The treatment is followed by a distilled water rinse for about 20 seconds to remove the cleaning solution. After this cleaning treatment, the activation dip of Step 4 is repeated to prepare the substrate for the following second copper dip.

In the next step, Step 10, the disc is given a second copper dip by immersing it in a copper solution for about 6 minutes. This solution can be the same as that used in the first dip in Step 5. Suitable copper thickness ranges have been found to be from 5 to 25 microinches. It should be noted here that if, as a result of the polishing and dipping of Steps 7, 8, 9 and 10, the smoothness is not satisfactory (although this was not a problem to the inventors), this series of steps should be repeated for perfecting the smoothing of the substrate.

The smoothing treatment steps now having been concluded, the disc is given a final water rinse (Step 11) and is then ready for immediate electroplating. It has been found that for such magnetic materials as cobalt-nickel, the electroplating step which follows this rinsing is best performed with a wet disc, i.e., a substrate which is wet when dipped into the electrolyte.

Figure 2:
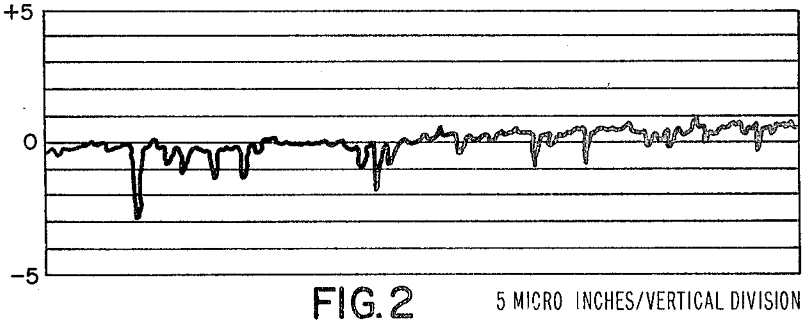
FIG. 2 is a similar profile for a finished magnetic disc treated with the substrate preparation process of the invention.

The results of the above described embodiment of the invention are graphically illustrated by the curves shown in FIGS. 1 and 2. These curves are an actual measurement of profile smoothness of plated aluminum discs, only one of which (FIG. 2) has been smoothed according to the invention. The curves were generated by a Taylor-Hobson surface measuring instrument (Taly Surf-Model 3). FIG. 1 represents the disc plated in the conventional manner. That is, the disc was lapped, polished, immerged in a bronze bath and plated. FIG. 2 shows the disc in its treated form subsequent to the succession of surfacing steps including immersing the disc in a bronze bath before and after the disc is polished and concluding with Step 10 in the embodiment. The surface of FIG. 1 will be noted to possess many extreme variations from surface normality. Such variations would be such depressions as depression 1 which probably comprises a pinhole of the type which would lay bare the aluminum substrate, even after plating and hence poison the magnetic coating, producing magnetic discontinuities (rejection-errors) therein. Further variations are such protuberances as peak 2 in FIG. 1 which may comprise either a protuberance of substrate material or a coating lump. Similar and more extreme peaks on the substrate are formed as a result of pinhole formations in which aluminum hydroxide is deposited during electroplating. This can result in discontinuities in magnetic material at this peak, as well as interfere with passage of the magnetic head over the disc. It is evident from a consideration of the surface profile of FIG. 2 that the smoothing operation has vastly reduced these surface discontinuities.

FIG. 3 is a photomicrograph of 114 magnification, and illustrates the surface appearance of a typical aluminum substrate before the application of the steps of the invention. Circle C has been drawn around one of the more serious pinholes on this disc. Such a discrete defect, due to blistering effects, will almost certainly result in a rejection-type discontinuity after electroplating magnetic material upon the surface of the substrate.

It was found that this smoothing process was apt for the electroplating of cobalt-nickel films to a maximum of 100 microinches and films as thin as a minimum of 4 microinches. From this, it will be obvious that one of the virtues of this protective coating is that it may be kept effective though very thin. A further advantage is its convenience, using conventional materials and simple methods.

The above specific example of the employment of the inventive techniques is only suggestive of the scope of application of the invention and has been carefully described in order to aid those skilled in the art to practice the present invention. However, the details are not exhaustive and may be modified within the scope of the teaching of the present invention and the claims to include other analogous uses apparent to those skilled in the art.

Further possible applications of the teaching of this inventive method for the smoothing and the removing of surface discontinuities on aluminum or other surfaces by depositing smooth, continuous, protective coatings thereon will be apparent to those skilled in the art. Such applications would be: in the plating of mirror surfaces; in the fine-polishing of bearing or other surfaces; and in the smoothing of any surface compatible with copper or similar deposition. Other applications would be: preparing magnetic surfaces for optical readout (for example, Kerr optical readout) where surface smoothness and reflectivity are crucial in the polishing of wearing surfaces such as shims and bearings; in the preparation of optical surfaces, especially the reflective type such as mirror-facings and the like; and for similar pre-plating applications so as to produce a smooth, continuous coating such as that desired in the magnetic disc coating described in the preferred embodiment.

The above specific example of the employment of the inventive techniques are purely suggestive of some ways of using the invention and have been carefully described in order to aid those skilled in the art to practice the present invention. However, the details are not exhaustive and may be modified within the scope of the teaching of the present invention and the claims to include other analogous uses apparent to those skilled in the art.

Further applications will be obvious to those skilled in the art and the invention should not be considered as confined to the few embodiments described above. While the invention has been particularly shown and described with reference to the preferred embodiments thereof, it will be understood by those skilled in the art that various changes in form and details, in constituents and steps, in concentrations and in ranges may be made without departing from the spirit and scope of the invention.

What is claimed is:

1. In a method of plating a layer of magnetic material on a substrate containing aluminum, the steps comprising:

immersing the surface of said substrate in a bath having cations of at least one metal selected from the group consisting of copper, zinc, and tin, so as to deposit a continuous film of at least one of said metals over the substrate surface;

thereafter polishing said continuous film to level said film to a surface smoothness of about one microinch, arithmetic average, whereby portions of the substrate surface are exposed;

repeating said immersion step to cover said exposed portions of said substrate surface and thereby again form a continuous film over the substrate surface; and plating said layer of magnetic material on said continuous film of said substrate containing aluminum.

2. The method of claim 1 wherein, prior to said first immersion, the smoothness of said substrate surface is not greater than about nine microinches.

3. The method of claim 1 wherein the thickness of said magnetic film is at least about four microinches.

4. In a method of electroplating a nickel-cobalt layer on a substrate containing aluminum, the steps comprising:

immersing the surface of soid substrate in a bath comprising copper ions so as to deposit a copper containing continuous film over the surface;

thereafter polishing said continuous film to level the film to a surface of at least one microinch, arithmetic average, whereby portions of the substrate surface are exposed;

thereafter immersing said polished surface into said bath to cover said exposed portions of said substrate surface with a copper containing film and thereby again form a continuous film over the substrate surface; and electroplating said nickel-cobalt layer on said continuous film of said substrate containing aluminum.

5. The method of claim 4 wherein said bath is a copper-stannate bath.

6. The method of claim 5 wherein said substrate surface is immersed in said bath for a time sufficient to deposit a film thickness of at least about five microinches.

References Cited by the Examiner

UNITED STATES PATENTS

| | | | |
|---|---|---|---|
| 2,297,241 | 9/1942 | Perner | 117—130 |
| 3,108,006 | 10/1963 | Kenedi et al. | 117—130 |

OTHER REFERENCES

Graham: Electroplating Engineering Handbook, pgs. 67–68, 165–178, 1955, Reinhold Publisher.

IBM Technical Disclosure Bulletin, vol. 3, No. 5, pg. 50 (October 1960).

JOHN H. MACK, *Primary Examiner.*

MURRAY TILLMAN, L. G. WISE, W. VAN SISE, *Assistant Examiners.*